United States Patent
Zhang et al.

(10) Patent No.: US 10,712,893 B2
(45) Date of Patent: Jul. 14, 2020

(54) SINGLE-SURFACE POSITION SENSOR AND POSITIONING METHOD THEREOF

(71) Applicant: PEKING UNIVERSITY, Beijing (CN)

(72) Inventors: Haixia Zhang, Beijing (CN); Mayue Shi, Beijing (CN); Haotian Chen, Beijing (CN); Jinxin Zhang, Beijing (CN); Mengdi Han, Beijing (CN); Zongming Su, Beijing (CN); Bo Meng, Beijing (CN); Xiaoliang Cheng, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 14 days.

(21) Appl. No.: 15/542,599

(22) PCT Filed: Feb. 11, 2015

(86) PCT No.: PCT/CN2015/000091
§ 371 (c)(1),
(2) Date: Jul. 10, 2017

(87) PCT Pub. No.: WO2016/115648
PCT Pub. Date: Jul. 28, 2016

(65) Prior Publication Data
US 2018/0267650 A1    Sep. 20, 2018

(30) Foreign Application Priority Data

Jan. 21, 2015   (CN) .......................... 2015 1 0030512

(51) Int. Cl.
*G06F 3/046*   (2006.01)
*G06F 3/041*   (2006.01)
(Continued)

(52) U.S. Cl.
CPC ............. *G06F 3/046* (2013.01); *G01B 7/003* (2013.01); *G01D 5/20* (2013.01); *G06F 3/041* (2013.01)

(58) Field of Classification Search
CPC ......... G06F 3/046; G06F 3/044; G01B 7/003; G01D 5/20
See application file for complete search history.

(56) References Cited

U.S. PATENT DOCUMENTS 4,198,539 A * 4/1980 Pepper, Jr. .............. G06F 3/045
178/18.05
5,748,110 A * 5/1998 Sekizawa ................ G06F 3/046
178/18.07
(Continued)

FOREIGN PATENT DOCUMENTS

CN     103411710    11/2013
CN     103684035    3/2014
(Continued)

OTHER PUBLICATIONS

International Search Report, issued in the corresponding PCT application No. PCT/CN2015/000091, dated Sep. 24, 2015, 6 pages.

*Primary Examiner* — Sahlu Okebato
(74) *Attorney, Agent, or Firm* — Hamre, Schumann, Mueller & Larson, P.C.

(57) ABSTRACT

A single-surface position sensor and a positioning method thereof are disclosed. The single-surface position sensor comprises a substrate layer (1) and induction electrodes (3, 4, 5, 6); the induction electrodes (3, 4, 5, 6) are located on the substrate layer (1); the sensor further comprises a friction layer (2); the friction layer (2) is located on the substrate layer (1); the friction layer (2) is located among the induction electrodes (3, 4, 5, 6); the individual induction electrodes (3, 4, 5, 6) are grounded through the same load resistors, so that an object under test contacts with and is (Continued)

separated from the friction layer (2) at least one time and different voltage outputs are generated across the various load resistors; a position of the object under test is determined by analyzing a ratio of the voltages of all the electrodes (3, 4, 5, 6); the single-surface position sensor is an active sensor and reduce energy consumption as compared with traditional sensors; the single-surface position sensor can be manufactured into a flexible transparent thin film and can be widely applied to portable electronic devices and wearable devices; and the single-surface position sensor is simple in process and low in cost.

6 Claims, 7 Drawing Sheets

(51) Int. Cl.
  *G01B 7/00* (2006.01)
  *G01D 5/20* (2006.01)

(56) References Cited

U.S. PATENT DOCUMENTS

| | | | |
|---|---|---|---|
| 2003/0063073 A1* | 4/2003 | Geaghan | G06F 3/0416 345/173 |
| 2011/0285666 A1 | 11/2011 | Poupyrev et al. | |
| 2013/0044079 A1* | 2/2013 | Fang | G06F 3/045 345/174 |
| 2013/0164543 A1* | 6/2013 | Shibuya | G06F 1/1643 428/428 |
| 2014/0063368 A1* | 3/2014 | Yamazaki | G02F 1/13338 349/12 |

FOREIGN PATENT DOCUMENTS

| | | |
|---|---|---|
| CN | 103780120 | 5/2014 |
| CN | 203720803 | 7/2014 |
| CN | 104283453 | 1/2015 |

* cited by examiner

```
┌─────────────────────────────────────────────────────────────────────────┐
│ An operation region of the sensor is divided into a plurality of test    │ ─ S610
│ points, and an induction test is performed on each test point in order,  │
│ to obtain peak voltage data of respective electrodes corresponding to    │
│ each test point                                                          │
└─────────────────────────────────────────────────────────────────────────┘
                                      │
┌─────────────────────────────────────────────────────────────────────────┐
│ A transverse electrode peak voltage ratio corresponding to each test     │
│ point in each row of test points is calculated according to peak voltage │
│ data of the respective electrodes corresponding to the test point, to fit│ ─ S620
│ out a transverse fitting curve of each row of the test points, and a     │
│ longitudinal electrode peak voltage ratio corresponding to each test     │
│ point in each column of test points is calculated according to peak      │
│ voltage data of the respective electrodes corresponding to the test      │
│ point, to fit out a longitudinal fitting curve of each column of test    │
│ points                                                                   │
└─────────────────────────────────────────────────────────────────────────┘
                                      │
┌─────────────────────────────────────────────────────────────────────────┐
│ points corresponding to transverse electrode peak voltage ratios of a    │ ─ S630
│ position under test on various transverse fitting curves are connected   │
│ or fit, to obtain a curve $L_1$, and points corresponding to longitudinal│
│ electrode peak voltage ratios of the position under test on various      │
│ longitudinal fitting curves are connected or fit, to obtain a curve $L_2$│
└─────────────────────────────────────────────────────────────────────────┘
                                      │
┌─────────────────────────────────────────────────────────────────────────┐
│ a coordinate of a point of intersection of the curve $L_1$ and the curve │ ─ S640
│ $L_2$ is determined as a coordinate of the position under test           │
└─────────────────────────────────────────────────────────────────────────┘
```

SINGLE-SURFACE POSITION SENSOR AND POSITIONING METHOD THEREOF

TECHNICAL FIELD

The present disclosure relates to a single-surface position sensor and a positioning method thereof, and in particular, to an electrostatic induction based single-surface position sensor, which belongs to a field of sensor technology.

BACKGROUND

A position sensor is a commonly used sensor, which is mainly applied to a touch screen, object positioning, displacement measurement and control etc. The position sensor can particularly improve the level of human computer interaction, and has an advantage of convenience and reliability. There are two types of position sensors, which comprise a contact sensor and a proximity sensor. Specifically, according to its operation principle, the position sensor can be classified into a capacitive sensor, an electromagnetic sensor, a piezoelectric sensor, a photoelectric sensor, a differential transformer sensor, and an eddy current sensor etc.

An existing sensor is a passive sensor, which has a disadvantage of high energy consumption, large volume, low resolution, and high cost.

The existing position sensor mostly uses a digital positioning technology which is based on a sensor array, and determines a position according to the position of the stimulated sensor in the sensor array. In this case, the positioning accuracy of a digital sensor is limited by a density of the sensor array. Meanwhile, the digital sensor requires a high-quality fabrication process and raises the total cost.

SUMMARY

The present disclosure is to provide a single-surface position sensor based on electrostatic and triboelectric principle, in order to reduce energy consumption of the sensor, improve resolution, and reduce cost. The technical solution which is used by the present disclosure to address its technical problem is as follow.

According to an aspect of the present disclosure, there is provided a single-surface position sensor, comprising:
a substrate layer; and
induction electrodes located on the substrate layer.

Furthermore, the single-surface position sensor further comprises a friction layer located on the substrate layer and located among the induction electrodes.

Furthermore, the single-surface position sensor further comprises a friction layer located under the substrate layer.

Furthermore, a number of the induction electrodes is one or more.

Furthermore, individual induction electrodes are grounded through load resistors which are the same, such that an object under test contacts with or is separated from the friction layer at least one time, different voltage outputs are generated across respective load resistors; and a position of the object under test is determined by analyzing a ratio of voltages of the respective electrodes.

According to another aspect of the present disclosure, there is provided a positioning method of a single-surface position sensor adapted to the single-surface position sensor described above, comprising steps of:

dividing an operation region of the sensor into a plurality of test points, and performing an induction test on each test point in order, to obtain peak voltage data of respective electrodes corresponding to each test point;

fitting out a transverse fitting curve of each row of test points according to peak voltage data of the respective electrodes corresponding to each row of test points, and fitting out a longitudinal fitting curve of each column of test points according to peak voltage data of the respective electrodes corresponding to each column of test points;

connecting or fitting points on transverse fitting curves which equal to transverse electrode peak voltage ratios of a position under test, to obtain a possible curve L1, and connecting or fitting points on longitudinal fitting curves which equal to longitudinal electrode peak voltage ratios of the position under test, to obtain a possible curve L2; and determining a coordinate of a point of intersection of the curve L1 and the curve L2 as a coordinate of the position under test.

Furthermore, the step of dividing an operation region of the sensor into a plurality of test points and performing an induction test on each test point in order to obtain peak voltage data of respective electrodes corresponding to each test point comprises:

dividing the operation region of the sensor into n*n regions in a transverse direction and a longitudinal direction, and performing induction tests on test points in order, to obtain peak voltages of four electrodes corresponding to each test point; and calculating a transverse electrode peak voltage ratio and a longitudinal electrode peak voltage ratio corresponding to each test point according to the peak voltages of four electrodes corresponding to each test point.

Furthermore, the step of fitting out the transverse fitting curve of each row of test points according to peak voltage data of the respective electrodes corresponding to each row of test points, and fitting out the longitudinal fitting curve of each column of test points according to peak voltage data of the respective electrodes corresponding to each column of test points comprises:

fitting the transverse electrode peak voltage ratio data corresponding to each test point in each row of test points by a set transverse fitting formula, according to coordinates corresponding to each test point in each row of test points, to obtain the transverse fitting curve of each row of test points; and fitting the longitudinal electrode peak voltage ratio data corresponding to each test point in each column of test points by a set longitudinal fitting formula, according to coordinates corresponding to each test point in each column of test points, to obtain the longitudinal fitting curve of each column of test points.

Furthermore, the step of connecting points corresponding to transverse electrode peak voltage ratios of a position under test on various transverse fitting curves to obtain a curve L1, and connecting points corresponding to longitudinal electrode peak voltage ratios of the position under test on various longitudinal fitting curves to obtain a curve L2 comprises:

pressing the position under test on the single-surface position sensor to be located, to obtain peak voltages of four electrodes corresponding to the position under test, and calculating a transverse electrode peak voltage ratio and a longitudinal electrode peak voltage ratio corresponding to the position under test;

determining one designated point on each transverse fitting curve, according to the transverse electrode peak voltage ratio corresponding to the position under test, and connecting or fitting designated points on all transverse fitting curves, to obtain a possible curve L1 of the position under test; and determining one designated point on each longitudinal fitting curve, according to the longitudinal electrode peak voltage ratio corresponding to the position under test, and connecting or fitting designated points on all longitudinal fitting curves, to obtain a possible curve L2 of the position under test.

The benefits of the present disclosure are as follow.

Firstly, the single-surface position sensor according to the present disclosure is an active sensor, and can reduce energy consumption compared to a conventional sensor.

Secondly, the single-surface position sensor according to the present disclosure can be manufactured into a flexible transparent thin film, which can be widely applied to portable electronic devices and wearable devices.

Thirdly, the single-surface position sensor according to the present disclosure is simple in process and low in cost, and is suitable for large scale production.

Fourthly, the simulation positioning method principle according to the present disclosure has high reliability, stability and resolution, and is not limited by the density of the sensor array.

DETAILED DESCRIPTION

Hereinafter, technical solutions of the present disclosure will be understood better and completely and the advantageous thereof can be obtained with reference to the following detailed description the drawings, in combination with the drawings. However, the drawings illustrated herein intend to further understand the present disclosure, and consist of a portion of the present disclosure. Illustrated embodiments of the present disclosure and description thereof are used for explaining the present disclosure, and should not be understood as limitations on the present disclosure.

Obviously, many modifications and variations made by a person skilled in the art based on the principle of the present disclosure shall fall within the protection scope of the present disclosure.

Embodiment One

Figure 1:
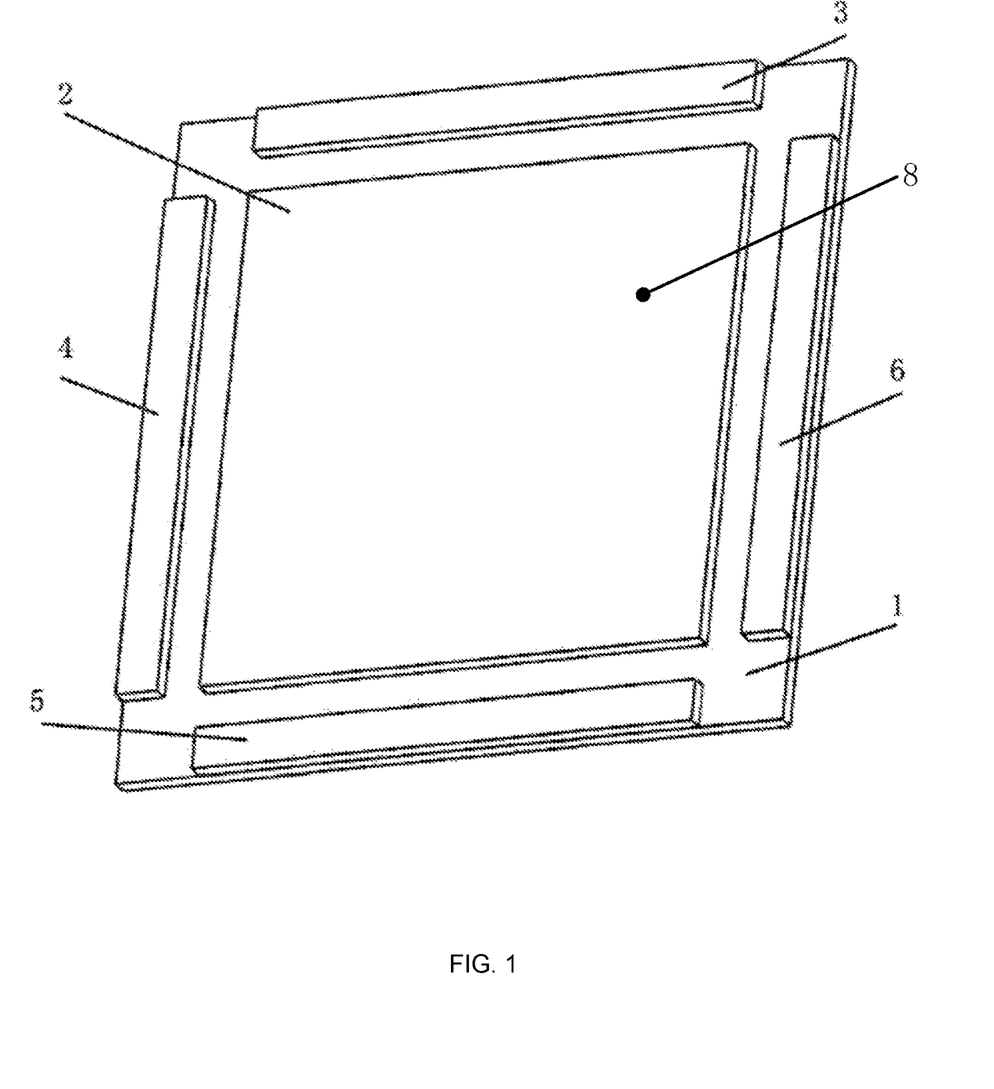
FIG. 1 is a 3D structure schematic view of a single-surface position sensor according to the present disclosure.
Figure 2:
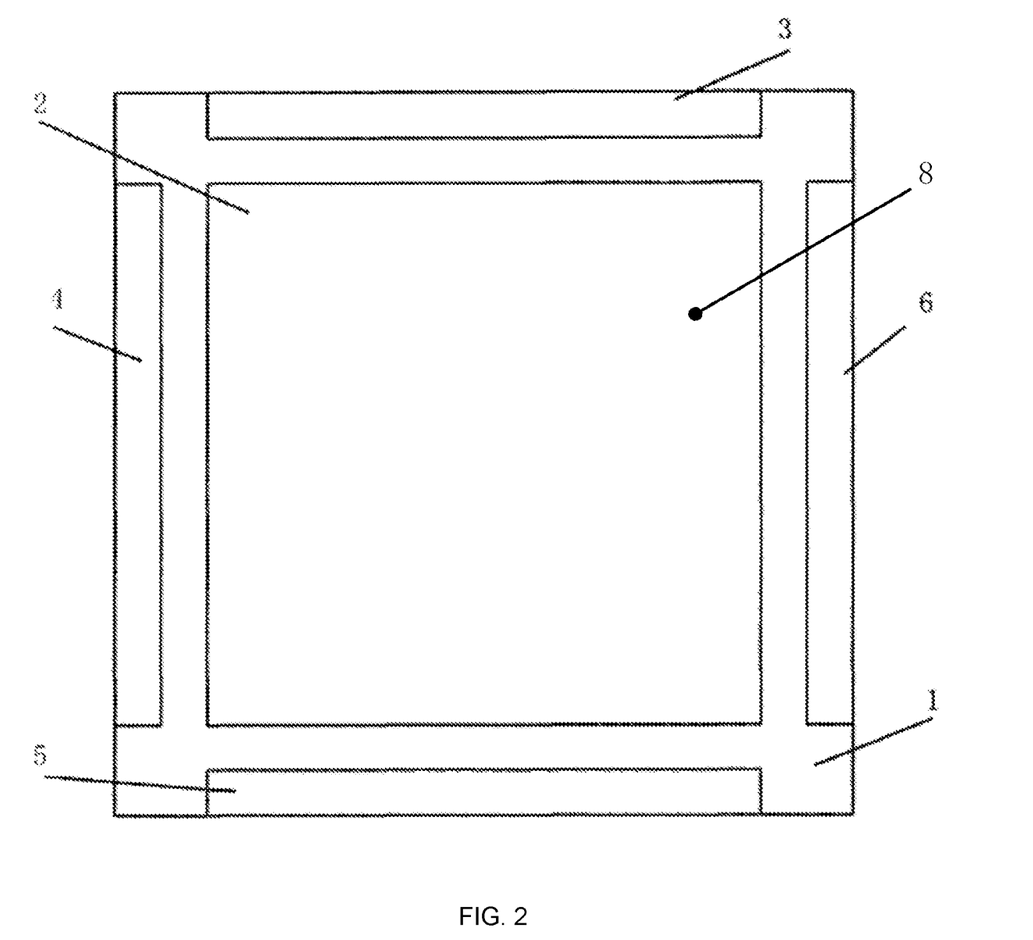
FIG. 2 is a top view of a single-surface position sensor according to the present disclosure.
Figure 3:
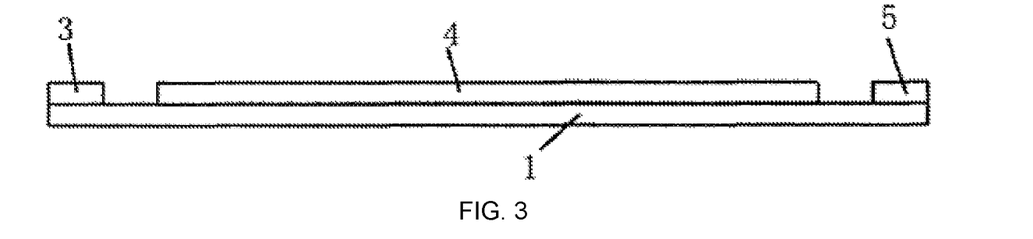
FIG. 3 is a left view of a single-surface position sensor according to the present disclosure.

As shown in FIGS. 1-3, a single-surface position sensor according to the present embodiment contains a substrate layer 1 and induction electrodes. An induction electrode 3, an induction electrode 4, an induction electrode 5, and an induction electrode 6 are located on the substrate layer 1.

In a preferred implementation, the sensor also contains a friction layer 2. The friction layer 2 is located on the substrate layer 1. The friction layer 2 is located among the induction electrode 3, the induction electrode 4, the induction electrode 5, and the induction electrode 6.

Figure 4:
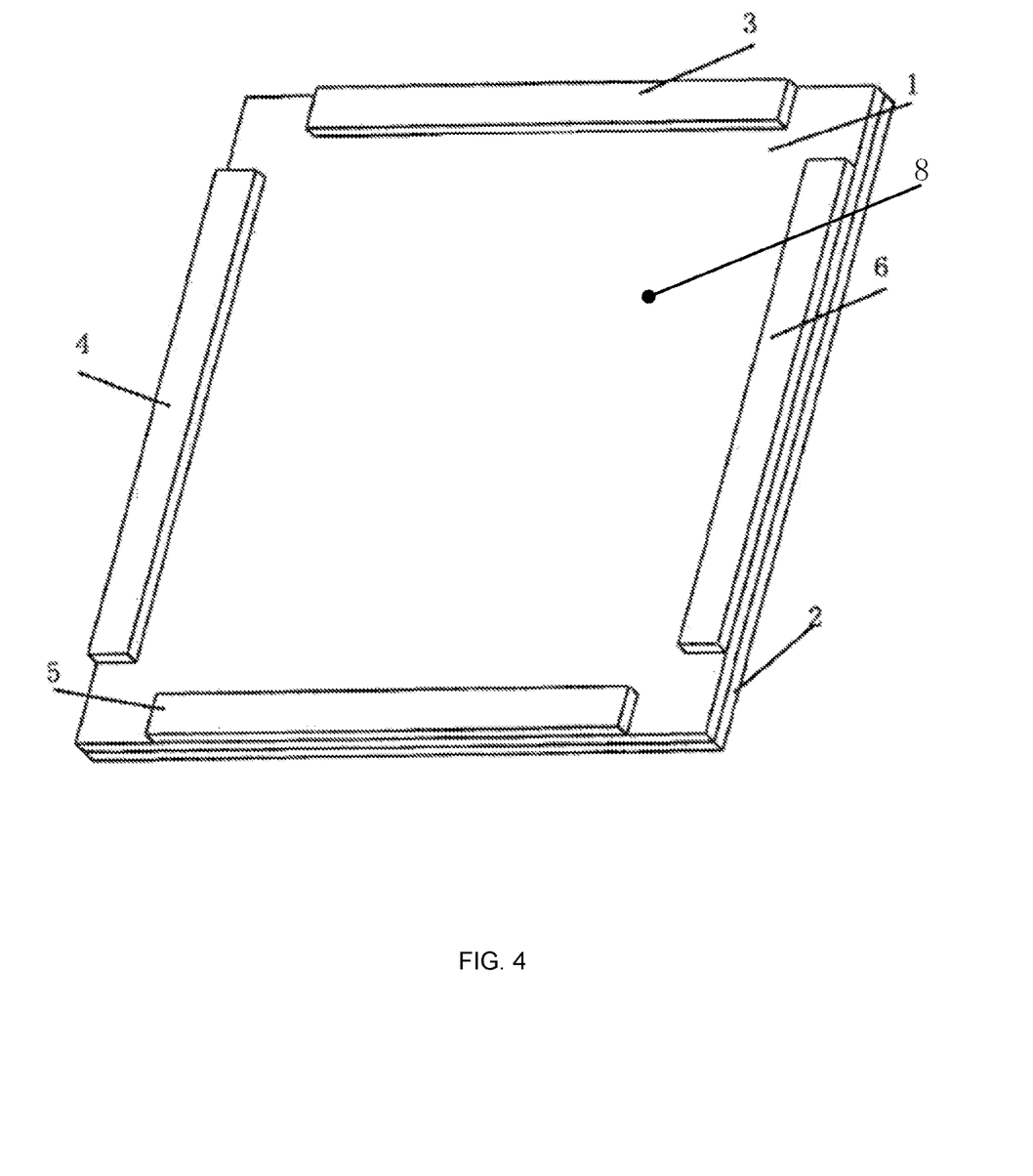
FIG. 4 is a 2D structure schematic view of a single-surface position sensor according to the present disclosure, in which a friction layer is located under a substrate layer.

In a preferred implementation, the sensor also contains a friction layer 2, the friction layer 2 is located under the substrate layer 1, and the induction electrode 3, the induction electrode 4, the induction electrode 5, and the induction electrode 6 are located on the substrate layer 1, as shown in FIG. 4.

Figure 5:
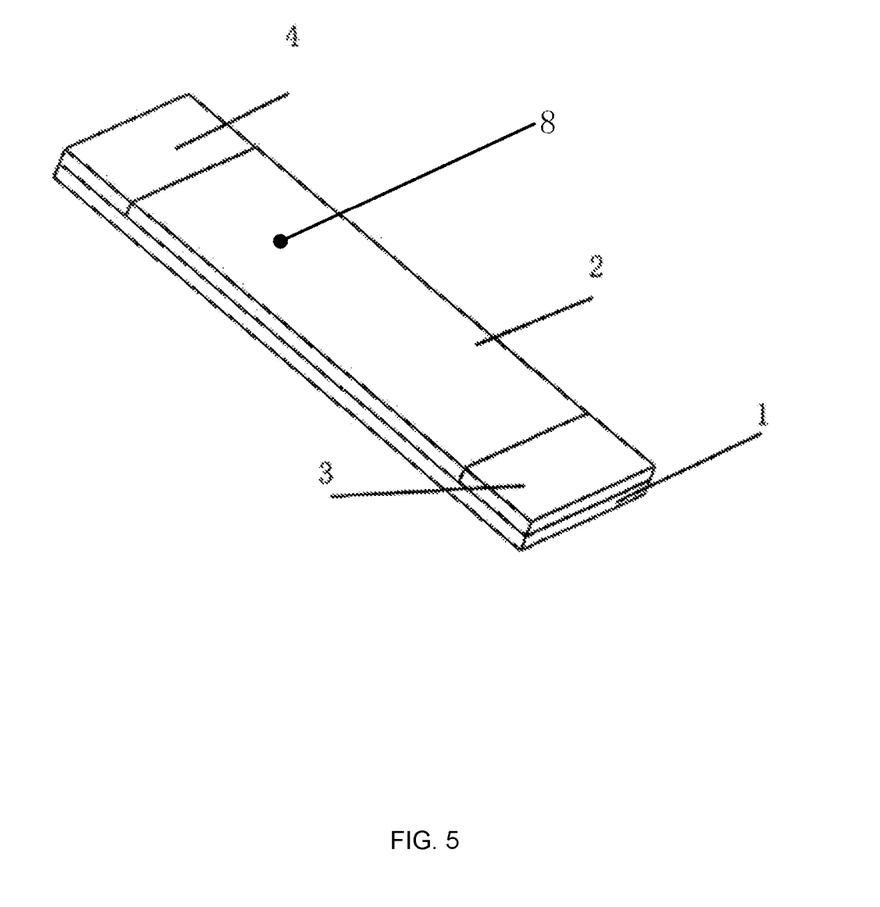
FIG. 5 is a 1D structure schematic view of a single-surface position sensor according to the present disclosure.

In a preferred implementation, a number of induction electrodes of a 2D sensor may be two or more, the friction layer 2 is located on the substrate layer 1, and the friction layer 2 is located between the induction electrode 3 and the induction electrode 4.

In a preferred implementation, the substrate layer 1 uses polyethylene terephthalate (PET) as a substrate material, and has a shape of square with a side length of preferably 80 mm.

In a preferred implementation, the friction layer 2 is polydimethylsiloxane (PDMS), and has a shape of square with a side length of preferably 60 mm.

In a preferred implementation, the induction electrode 3, the induction electrode 4, the induction electrode 5, and the induction electrode 6 are indium tin oxide (ITO) thin film with a length of preferably 60 mm, a width of preferably 5 mm, and a film thickness of preferably 185 nm.

In a preferred implementation, the substrate layer is of any insulation material of silicon oxide, glass, parylene N, polyamide, polyimide, polytetrafluoroethylene, polycarbonate, polydimethylsiloxane, polyethylene terephthalate, and polyethylene naphthalate.

In a preferred implementation, the friction layer is of any material of silicon oxide, glass, parylene N, polyamide, polyimide, polytetrafluoroethylene, polycarbonate, polydimethylsiloxane, polyethylene terephthalate, and polyethylene naphthalate, which has a smooth surface or micro-nanometer structure surface. These materials are easy to generate charge transfer when friction occurs and are insulated.

In a preferred implementation, the induction electrodes are of any material of metal, alloy, conductive metallic oxide, organic conductive material, graphite, and conductive nanometer material.

Operation Principle

Figure 7:
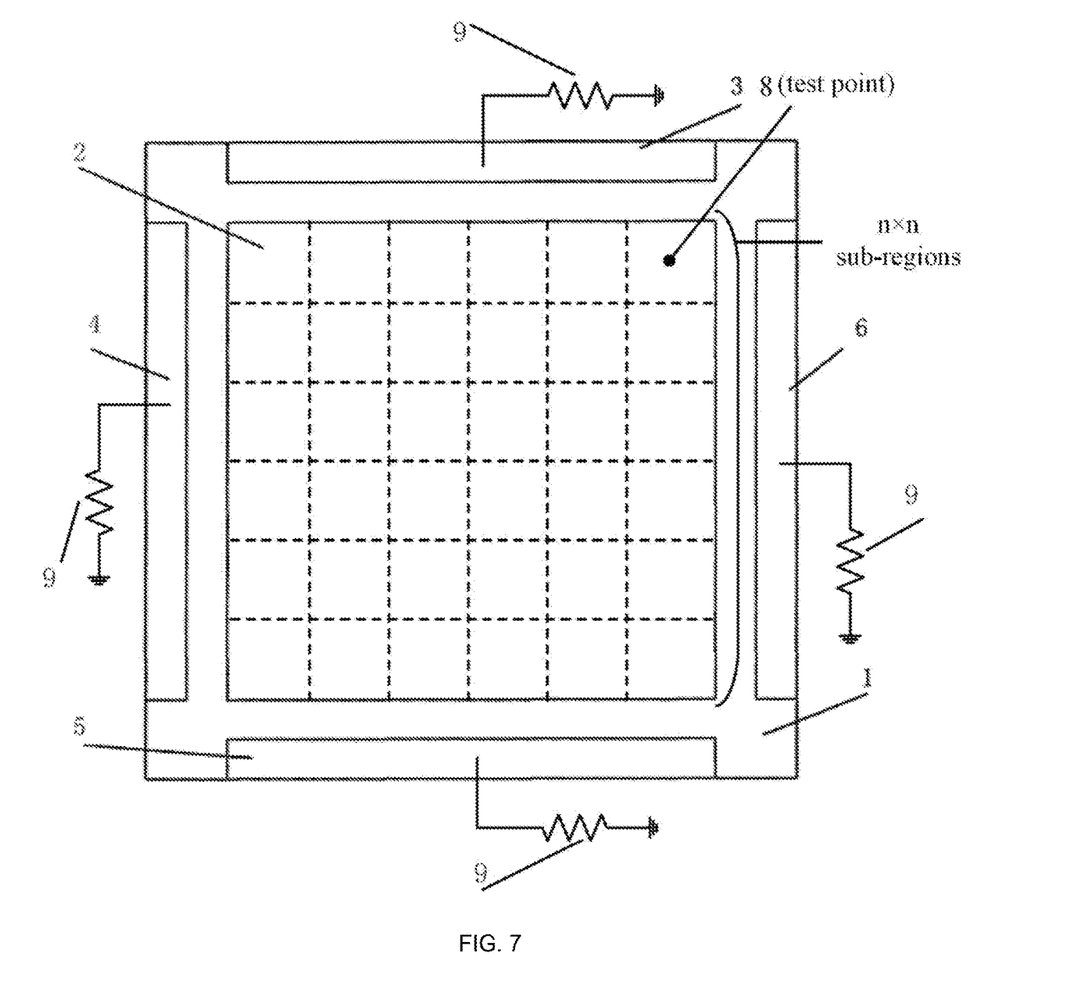
FIG. 7 is a 3D structure schematic view of a single-surface position sensor according to the present disclosure.

The individual induction electrodes are grounded through load resistors 9 in FIG. 7 which are the same, such that an object under test contacts with or is separated from the friction layer at least one time, and different voltage outputs are generated across respective load resistors. A position of the object under test is determined by analyzing a ratio of voltages of the respective electrodes. The induction electrode 3, the induction electrode 4, the induction electrode 5, and the induction electrode 6 can generate different voltage outputs respectively when a finger contacts with a portion of the friction layer 2 or is separated from the portion. A particular position at which contact or separation occurs between the finger and the friction layer 2 may be determined by measuring values of the voltages and comparing voltage relative values of the four electrodes.

Figure 6:
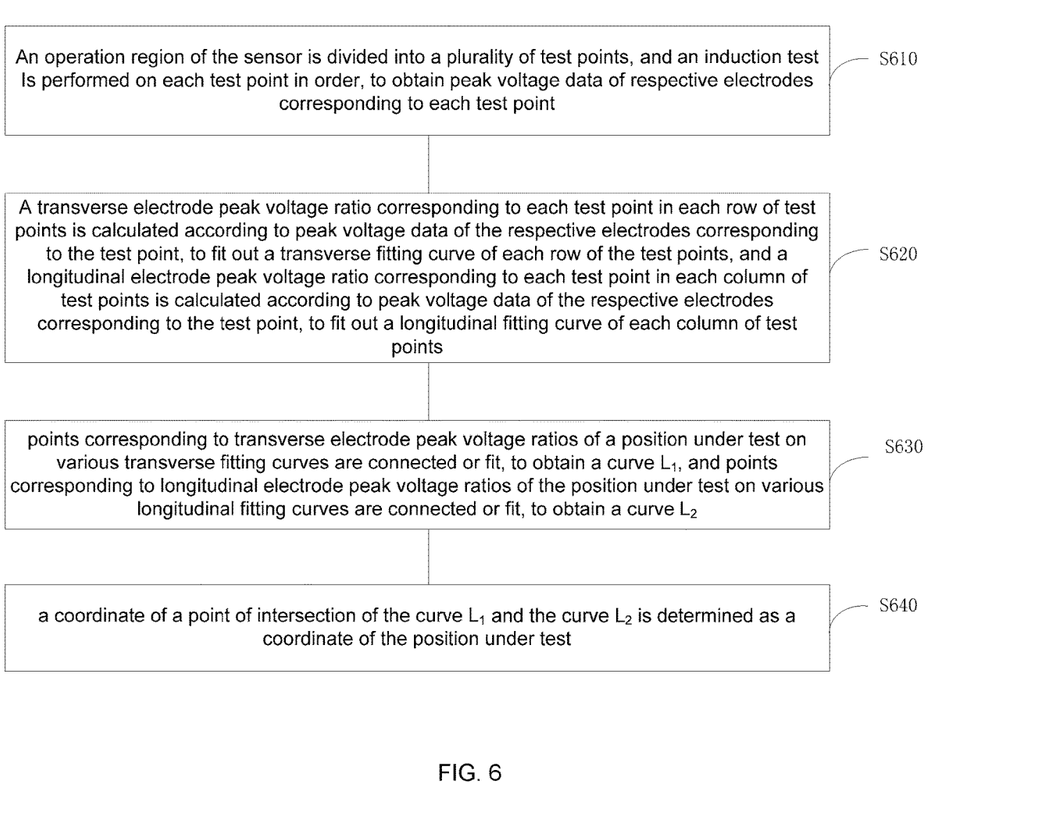
FIG. 6 is a process flow chart of a positioning method of a single-surface position sensor according to an embodiment of the present disclosure.

A process flow chart of a positioning method of a single-surface position sensor according to an embodiment of the present disclosure, as shown in FIG. 6, comprises steps as follow.

In step S610, an operation region of the sensor is divided into a plurality of test points 8 in FIG. 1, and an induction test is performed on each test point in order, to obtain peak voltage data of respective electrodes corresponding to each test point.

The operation region of the sensor is divided into n*n regions in a transverse direction and a longitudinal direction. Induction tests are performed on test points (with a center coordinate of (x, y)) in order, to obtain peak voltages of four electrodes corresponding to each test point. A left peak voltage and a right peak voltage are $P_1$ and $P_2$ respectively, and an up peak voltage and a down peak voltage are $P_3$ and $P_4$ respectively.

A transverse electrode peak voltage ratio and a longitudinal electrode peak voltage ratio corresponding to each test point are calculated according to peak voltages of four electrodes corresponding to each test point.

For example, a calculation formula of the transverse electrode peak voltage ratio may be:

$$R_{xij} = \frac{P_1}{P_2},$$

and a calculation formula of the longitudinal electrode peak voltage ratio may be:

$$R_{yij} = \frac{P_3}{P_4},$$

in which, i=1, 2, 3, . . . , n, and j=1, 2, 3, . . . , n.

In step S620, a transverse electrode peak voltage ratio corresponding to each test point in each row of test points is calculated according to peak voltage data of the respective electrodes corresponding to the test point, to fit out a transverse fitting curve of each row of the test points, and a longitudinal electrode peak voltage ratio corresponding to each test point in each column of test points is calculated according to peak voltage data of the respective electrodes corresponding to the test point, to fit out a longitudinal fitting curve of each column of test points.

The transverse electrode peak voltage ratio data corresponding to each test point in each row of test points is fit by a set transverse fitting formula, according to a coordinate corresponding to each test point in each row of test points, to obtain the transverse fitting curve of each row of test points. For example, the transverse fitting formula is:

$$R_{xi} = \frac{a_i + k_i x}{b_i - x},$$

in which i=1, 2, 3, . . . , n, and $a_i$, $b_i$ and $k_i$ are set fitting parameters.

The longitudinal electrode peak voltage ratio data corresponding to each test point in each column of test points are fit by a set longitudinal fitting formula, according to a coordinate corresponding to each test point in each column of test points, to obtain the longitudinal fitting curve of each column of test points. For example, the longitudinal fitting formula is:

$$R_{yj} = \frac{c_j + l_i y}{d_j - y},$$

in which i=1, 2, 3, . . . , n, and $c_j$, $d_j$ and $l_i$ are set fitting parameters.

In step S630, points corresponding to transverse electrode peak voltage ratios of a position under test on various transverse fitting curves are connected, to obtain a curve $L_1$, and points corresponding to longitudinal electrode peak voltage ratios of the position under test on various longitudinal fitting curves are connected, to obtain a curve $L_2$.

The position under test on the single-surface position sensor to be located is pressed, to obtain peak voltages of four electrodes corresponding to the position under test, and a transverse electrode peak voltage ratio and a longitudinal electrode peak voltage ratio of the position under test are calculated.

Figure 8:
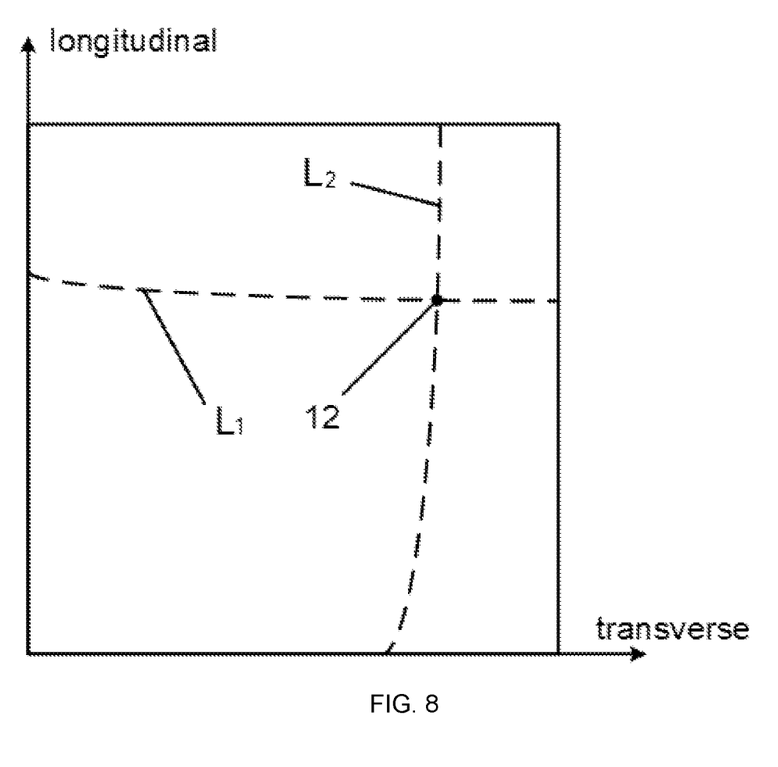
FIG. 8 is a measurement result of positioning of a single-surface position sensor according to an embodiment of the present disclosure.

One designated point on each transverse fitting curve is determined, according to the transverse electrode peak voltage ratio corresponding to the position under test, and designated points on all transverse fitting curves are connected or fit, to obtain a possible curve $L_1$ shown in FIG. 8 of the position under test.

One designated point on each longitudinal fitting curve is determined, according to the longitudinal electrode peak voltage ratio corresponding to the position under test, and designated points on all longitudinal fitting curves are connected or fit to obtain a possible curve $L_2$ shown in FIG. 8 of the position under test.

In step S640, a coordinate of a point of intersection 12 shown in FIG. 8 of the curve $L_1$ and the curve $L_2$ is determined as a coordinate of the position under test.

The technical effects of the present embodiment are as follows. The single-surface position sensor according to the present disclosure is an active sensor, and can reduce energy usage compared to a traditional sensor. The single-surface position sensor according to the present disclosure can be manufactured as flexible transparent thin film, and can be widely applied to a portable electronic device and a wearable device. The single-surface position sensor according to the present disclosure has a simple process and low cost, and is suitable for large scale production.

The above description is merely preferable embodiment of the present disclosure, and the particular implementation is only used to facilitate understanding of the core concept of the present disclosure. It should be noted that, a person skilled in the art may make any improvement and modification on the present disclosure without departing from the principle of the present disclosure, and these improvements and modifications shall also fall within the protection scope of the present disclosure as defined by the claims.

We claim:

1. A single-surface position sensor, comprising:
   a non-conductive substrate layer;
   a non-conductive friction layer; and
   induction electrodes located on the substrate layer, wherein
   each of the induction electrodes are grounded through respective load resistors, each of the load resistors having the same resistance, such that when an object presses the friction layer at a contact point, an electric field generated by charges on the friction layer and on the object induces different amounts of charge at each of the induction electrodes due to different strengths of electric field on each of the respective induction electrodes according distances between the contact point and each of the respective induction electrodes, different voltage outputs are generated across load resistors corresponding to each of the induction electrodes; and a position of the object is determined by analyzing a ratio of voltages of the respective load resistors.

2. The single-surface position sensor according to claim 1, wherein the friction layer is located on the substrate layer and between the induction electrodes.

3. The single-surface position sensor according to claim 1, wherein the friction layer is located under the substrate layer.

4. A positioning method of a single-surface position sensor adapted to the single-surface position sensor according to claim 1, comprising steps of:

dividing an operation region of the sensor in a transverse direction and a longitudinal direction into n*n sub-regions, each of the regions including a test point, and performing induction tests on each of the test points by pressing each of the test points to obtain peak voltages of four electrodes, the peak voltages corresponding to each test point when said test point is pressed; and calculating a transverse electrode peak voltage ratio and a longitudinal electrode peak voltage ratio corresponding to each test point according to the peak voltages of four electrodes corresponding to each test point;

fitting out a transverse fitting curve of each row of test points according to the transverse electrode peak voltage ratio of the respective electrodes corresponding to each row of test points, and fitting out a longitudinal fitting curve of each column of test points according to the longitudinal electrode peak voltage ratio of the respective electrodes corresponding to each column of test points;

connecting or fitting points corresponding to transverse electrode peak voltage ratios of a position under test on various transverse fitting curves, to obtain a curve $L_1$, and connecting or fitting points corresponding to longitudinal electrode peak voltage ratios of the position under test on various longitudinal fitting curves, to obtain a curve $L_2$; and determining a coordinate of a point of intersection of the curve $L_1$ and the curve $L_2$ as a coordinate of the position under test.

5. The positioning method of a single-surface position sensor according to claim 4, wherein the step of fitting out the transverse fitting curve of each row of test points according to the transverse electrode peak voltage ratio of the respective electrodes corresponding to each row of test points, and fitting out the longitudinal fitting curve of each column of test points according to the longitudinal electrode peak voltage ratio of the respective electrodes corresponding to each column of test points comprises:

fitting the transverse electrode peak voltage ratio corresponding to all test points in each row of test points by a set transverse fitting formula, according to a coordinate corresponding to each test point in each row of test points, to obtain the transverse fitting curve of each row of test points; and fitting the longitudinal electrode peak voltage ratio data corresponding to all test points in each column of test points by a set longitudinal fitting formula, according to a coordinate corresponding to each test point in each column of test points, to obtain the longitudinal fitting curve of each column of test points.

6. The positioning method of a single-surface position sensor according to claim 5, wherein the step of connecting points corresponding to transverse electrode peak voltage ratios of a position under test on various transverse fitting curves to obtain a curve $L_1$, and connecting points corresponding to longitudinal electrode peak voltage ratios of the position under test on various longitudinal fitting curves to obtain a curve $L_2$ comprises:

pressing the position under test on the single-surface position sensor to be located, to obtain peak voltages of four electrodes corresponding to the position under test, and calculating a transverse electrode peak voltage ratio and a longitudinal electrode peak voltage ratio corresponding to the position under test;

determining one designated point on each transverse fitting curve, according to the transverse electrode peak voltage ratio corresponding to the position under test, and connecting or fitting designated points on all transverse fitting curves, to obtain a possible curve $L_1$ of the position under test; and determining one designated point on each longitudinal fitting curve, according to the longitudinal electrode peak voltage ratio corresponding to the position under test, and connecting or fitting designated points on all longitudinal fitting curves, to obtain a possible curve $L_2$ of the position under test.

* * * * *